UNITED STATES PATENT OFFICE.

CARL W. VOLNEY, OF NEW YORK, N. Y., ASSIGNOR TO THE VOLNEY CHEMICAL COMPANY.

EXPLOSIVE COMPOUND.

SPECIFICATION forming part of Letters Patent No. 249,490, dated November 15, 1881.

Application filed March 17, 1881. (No specimens.)

*To all whom it may concern:*

Be it known that I, CARL WALTER VOLNEY, of the city of New York, in the county and State of New York, have invented a new and useful Explosive Compound, of which the following is a true and correct description.

To manufacture this explosive compound an oily liquid is first prepared by saturating concentrated glycerine with dry hydrochlorine or muriatic-acid gas, said glycerine being kept during the process of saturation at a temperature of not more than 250° and not less than 212° of Fahrenheit's scale. The glycerine, thus saturated with hydrochlorine gas, and thereby converted into propenylchlorhydrate, or, as it was formerly called, "glycerine chlorhydrin," undergoes thereby the following decomposition, expressed by $C_3H_5(OH)_3 + HCl = C_3H_5Cl(OH)_2 + H_2O$. This glycerine chlorhydrin, after having cooled to about 50° Fahrenheit, is then gradually incorporated into a mixture of sulphuric and nitric acid, said mixture having previously been cooled to a temperature of 40° or 35° Fahrenheit. The process which then takes place is expressed by $C_3H_5Cl(OH)_2 + 2HNO_3 = C_3H_5Cl(NO_3)_2 + H_2O$, thereby forming monochlordinitrin or chlorpropenyldinitrate and water. The whole liquid is poured into a tank containing a large quantity of water, whereby the monochlordinitrin is precipitated on the bottom of said tank. It is then drawn off and repeatedly washed or agitated with renewed fresh quantities of water to remove traces of adhering acids. For this purpose also the lastly-used wash-waters may contain some sodium carbonate in solution, whereby the last traces of adhering acids are neutralized. The oily liquid thus obtained is the above-mentioned monochlordinitrin or chlorpropenyldinitrate, $C_3H_5Cl(NO_3)_2$, and is now ready for the manufacture of the explosive compound, the subject of this specification. The quantities of glycerine chlorhydrin and of sulphuric acid and nitric acid which are to be used in the above-described process of preparing monochlordinitrin may somewhat vary with the degree of concentration of the glycerine and the acids used. If the glycerine showed a concentration expressed by 30° of Baume's hydrometer, the sulphuric acid 66°, and the nitric acid 50° at a temperature of 65° Fahrenheit, and the acids were mixed previously in the proportion, by weight, of two parts of sulphuric acid to one part of nitric acid, then a perfect nitration of the glycerine chlorhydrin is effected by using one pound of the latter to five pounds of the acid mixture.

The monochlordinitrin forms one part of the new explosive compound. The other part, which appears in powder form, and which I shall name "the composition," being composed of an intimate mixture of fibrous organic substance and certain oxidizing agents, such as are formed by chlorates and nitrates, serves the purpose of holding in absorption and to decompose the monochlordinitrin when subjected to a sufficient degree of heat. For the latter reason the chlorates and nitrates, besides furnishing oxygen, have to supply a sufficient quantity of a basic or metallic element, as potassium, sodium, barium, and other suitable equivalent alkaline metals, which can readily combine with the chlorine of the monochlordinitrin and form therewith a chloride.

It should further be observed that the composition has to be sufficiently sensitive to the initiative force of an exploding charge or detonator, as used in the discharge of nitro-glycerine, dynamite, and other so called high explosives. The first of these conditions I fulfill by an appropriate quantity of sodium nitrate. The sodium forms sodium chloride with the chlorine of the monochlordinitrin; the second, if necessary, by a moderate addition of potassium chlorate. The oxygen of these salts is used in oxidizing carbon and hydrogen, which are contained in excess over its own oxygen in the monochlordinitrin. This mutual relation and decomposition between monochlordinitrin and sodium nitrate in the moment of explosion is a characteristic feature of this explosive compound, and distinguishes it from all other high explosive compounds. The decomposition may be expressed thus: $2[C_3H_5Cl(NO_3)_2] + 2(NaNO_3) = 2NaCl + 6CO_2 + 5H_2O + 4N + O$.

As very effective, I found the following proportions for the preparation of a serviceable composition: potassium chlorate, twenty-five pounds; sodium nitrate, sixty-five pounds; dried woody fiber, ten pounds. Into this composition the above-described monochlordinitrin is incorporated in various proportions; but in order to produce efficient compounds the proportions should be between monochlordinitrin and sodium nitrate as nearly as possible representing their equivalent relations, thus, $2[C_3H_5CL(NO_3)_2] + 2(NaNO_3)$, or, in weights, 200.37 parts of monochlordinitrin to 84.99 parts of sodium nitrate.

I have prepared compounds containing forty parts, by weight, of monochlordinitrin to sixty parts of the above-described composition, so that it contained an excess of sodium nitrate.

If the compound does not contain a basic metal, or not enough of it to form a chloride with the chlorine of the monochlordinitrin, an efficient explosive compound can thereby not be produced. Mixing, for example, monochlordinitrin with silica or other inert matter does not give an efficient explosive compound, whereas nitro-glycerine forms with silica the very efficient dynamite. This feature or quality of nitro-glycerine, not requiring any assistance from any admixture or composition, is the cause that the value or strength of the nitro-glycerine compounds is almost exclusively depending upon the quantity of nitro-glycerine which they contain; but the value or strength of the explosive compound invented by me depends upon the quantity of the mixture of monochlordinitrin and sodium nitrate in the equivalent proportions set forth before, as this is necessary for a mutual decomposition and the producing of an efficient explosion.

Patents have been granted to Alfred Nobel and many others for explosive compounds containing nitro-glycerine, potassium chlorate, nitrates, and woody fiber.

I do not claim any of these as my invention, or any part thereof.

Having fully described my invention, what I desire to secure by Letters Patent is—

1. The mixture consisting of the substance known as and named "monochlordinitrin" or "chlorpropenyldinitrate," and a nitrate of potassium, sodium, barium, or any other suitable alkaline metal, in such equivalent quantities that thereby a mutual decomposition between monochlordinitrin and the nitrate can be effected, as described.

2. The mixture of monochlordinitrin or chlorpropenyldinitrate with nitrates and chlorates of potassium, sodium, barium, or other suitable equivalent alkaline metals, and vegetable fiber or charcoal, or both, in the manner and for the purposes described.

CARL WALTER VOLNEY.

Witnesses:
WM. H. MORRIS,
CHAS. G. GRIFFIN.